United States Patent
Liu

(10) Patent No.: US 9,939,049 B2
(45) Date of Patent: Apr. 10, 2018

(54) SPEED CHANGE DEVICE

(71) Applicant: TERAFORCE Precision Technology Co., Ltd., Taichung (TW)

(72) Inventor: Te-En Liu, Taichung (TW)

(73) Assignee: Teraforce Precision Technology Co., Ltd., Taichung (TW)

( * ) Notice: Subject to any disclaimer, the term of this patent is extended or adjusted under 35 U.S.C. 154(b) by 0 days.

(21) Appl. No.: 15/147,160

(22) Filed: May 5, 2016

(65) Prior Publication Data

US 2017/0299020 A1    Oct. 19, 2017

(30) Foreign Application Priority Data

Apr. 13, 2016  (TW) .............................. 105111559 A

(51) Int. Cl.
  *F16H 3/70* (2006.01)
  *F16H 57/04* (2010.01)
(52) U.S. Cl.
  CPC ........... *F16H 3/70* (2013.01); *F16H 57/0484* (2013.01)
(58) Field of Classification Search
  None
  See application file for complete search history.

(56) References Cited

U.S. PATENT DOCUMENTS

| | | | | |
|---|---|---|---|---|
| 4,697,477 A * | 10/1987 | Barr | ...................... | F16D 57/002 475/154 |
| 4,811,699 A * | 3/1989 | Shiomi | ...................... | F01L 1/02 123/90.23 |
| 5,071,393 A * | 12/1991 | Genovese | ................. | F16H 3/70 475/166 |
| 7,637,835 B2 * | 12/2009 | Liu | ........................... | F16H 1/32 475/170 |
| 8,827,854 B2 * | 9/2014 | Nomura | .............. | F16H 57/0428 475/170 |
| 2004/0097319 A1 * | 5/2004 | Tsurumi | .................... | F16H 1/32 475/165 |
| 2010/0319569 A1 * | 12/2010 | Miki | ........................ | B61C 9/46 105/108 |

(Continued)

FOREIGN PATENT DOCUMENTS

| | | |
|---|---|---|
| CN | 1443953 A | 9/2003 |
| CN | 204878680 U | 12/2015 |
| TW | M528384 | 9/2016 |

*Primary Examiner* — Justin Holmes
*Assistant Examiner* — Timothy Hannon
(74) *Attorney, Agent, or Firm* — Muncy, Geissler, Olds & Lowe, P.C.

(57) ABSTRACT

A speed change device is provided, including: an outer ring part, an interior thereof including at least one outer gear; a spindle, coaxially pivoted to the outer ring part with the at least one outer gear, having a central axis, an outer circumference of the spindle having a plurality of cam assembling portions; a plurality of cam parts, respectively disassemblably assembled to the plurality of cam assembling portions, synchronizingly rotating with the spindle, at least two of the plurality of cam parts having a phase difference of angle which is larger than zero degree; a plurality of inner gears, being rigid, respectively sleeved on the plurality of cam parts and being non-rotatable with the plurality of the cam parts, respectively meshed with the at least one outer gear.

6 Claims, 7 Drawing Sheets

(56) References Cited

U.S. PATENT DOCUMENTS

| | | | |
|---|---|---|---|
| 2013/0319145 A1* | 12/2013 | Shimada | B60K 7/0007 74/89.16 |
| 2014/0018203 A1* | 1/2014 | Huang | F16H 1/32 475/168 |
| 2015/0005130 A1* | 1/2015 | Yamamoto | B60K 7/00 475/149 |
| 2015/0176680 A1* | 6/2015 | Fujimoto | F16H 1/32 475/162 |

* cited by examiner

SPEED CHANGE DEVICE

BACKGROUND OF THE INVENTION

Field of the Invention

The present invention relates to a speed change device.

Description of the Prior Art

Conventionally, a speed change device can adjust a speed of a mechanism mainly via a gear so as to increase or decrease the speed. If the speed needs to be deceased or increased in a great extent, a volume of the speed change device will increase accordingly, and it is not practical.

However, in a conventional speed change device, a plurality of cam parts are fixed on a spindle directly, and if one of the cam parts is broken or a number of the cam parts needs to be adjusted, a user needs to replace the plurality of cam parts along with the spindle. An inner gear and an outer gear face contact each other and produce a greater friction, so a transmission of force is influenced. In addition, a gap exists between the cam part of this type of speed change device and the inner gear, and the inner gear is usually flexible; therefore, the cam part of the speed change device, the inner gear and the outer gear may not have the preferable conversion efficiency and the preferable precision because of insufficiency of rigidity of the inner gear or lack of an secondary actuating mechanism.

The present invention has arisen to mitigate and/or obviate the afore-described disadvantages.

SUMMARY OF THE INVENTION

The major object of the present invention is to provide a speed change device, which can elevate the conversion efficiency, the actuating precision or the stability of force and is convenient to be assembled or disassembled. In addition, an inner mechanism can be adjusted according to various requirements.

To achieve the above and other objects, a speed change device is provided, including: an outer ring part, an interior thereof including at least one outer gear; a spindle, coaxially pivoted to the outer ring part with the at least one outer gear, having a central axis, an outer circumference of the spindle having a plurality of cam assembling portions; a plurality of cam parts, respectively disassemblably assembled to the plurality of cam assembling portions, synchronizingly rotating with the spindle, at least two of the plurality of cam parts having a phase difference of angle which is larger than zero degree; a plurality of inner gears, being rigid, respectively sleeved on the plurality of cam parts and being non-rotatable with the plurality of the cam parts, respectively meshed with the at least one outer gear.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
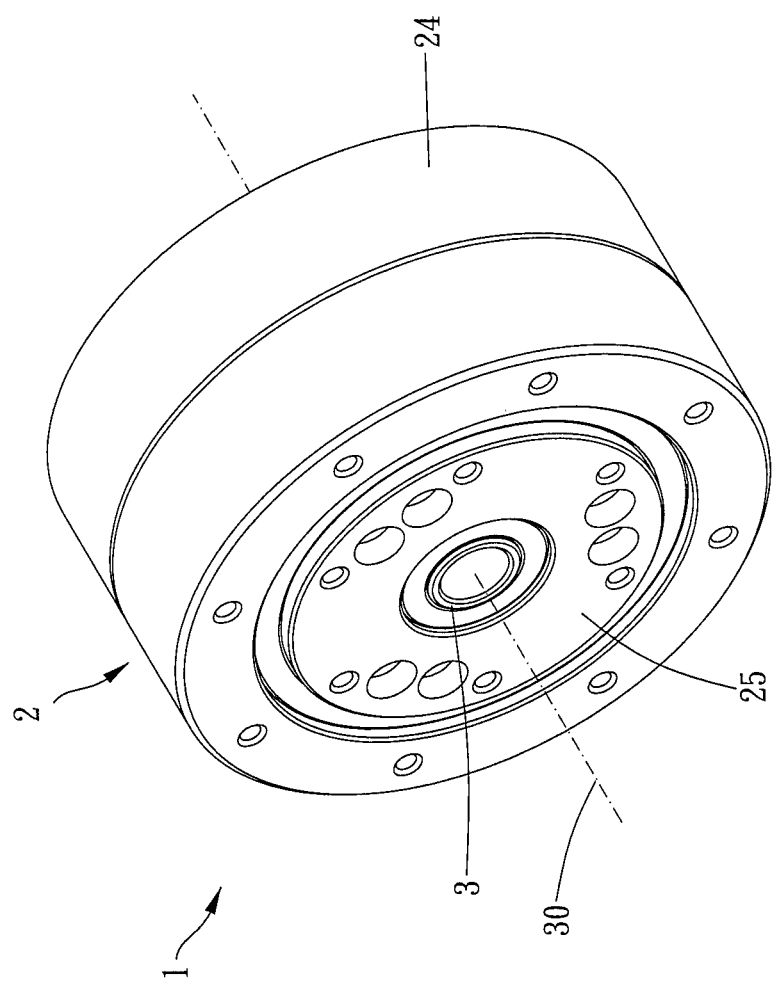
FIG. 1 is a stereogram of a first embodiment of the present invention.
Figure 2:
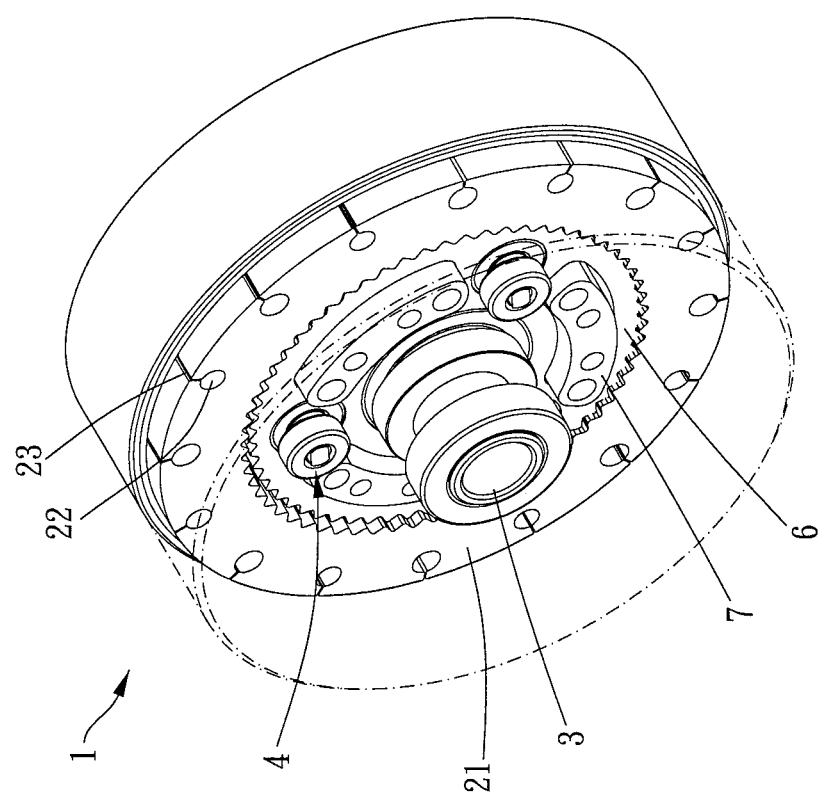
FIG. 2 is a perspective view of the first embodiment of the present invention.
Figure 3:
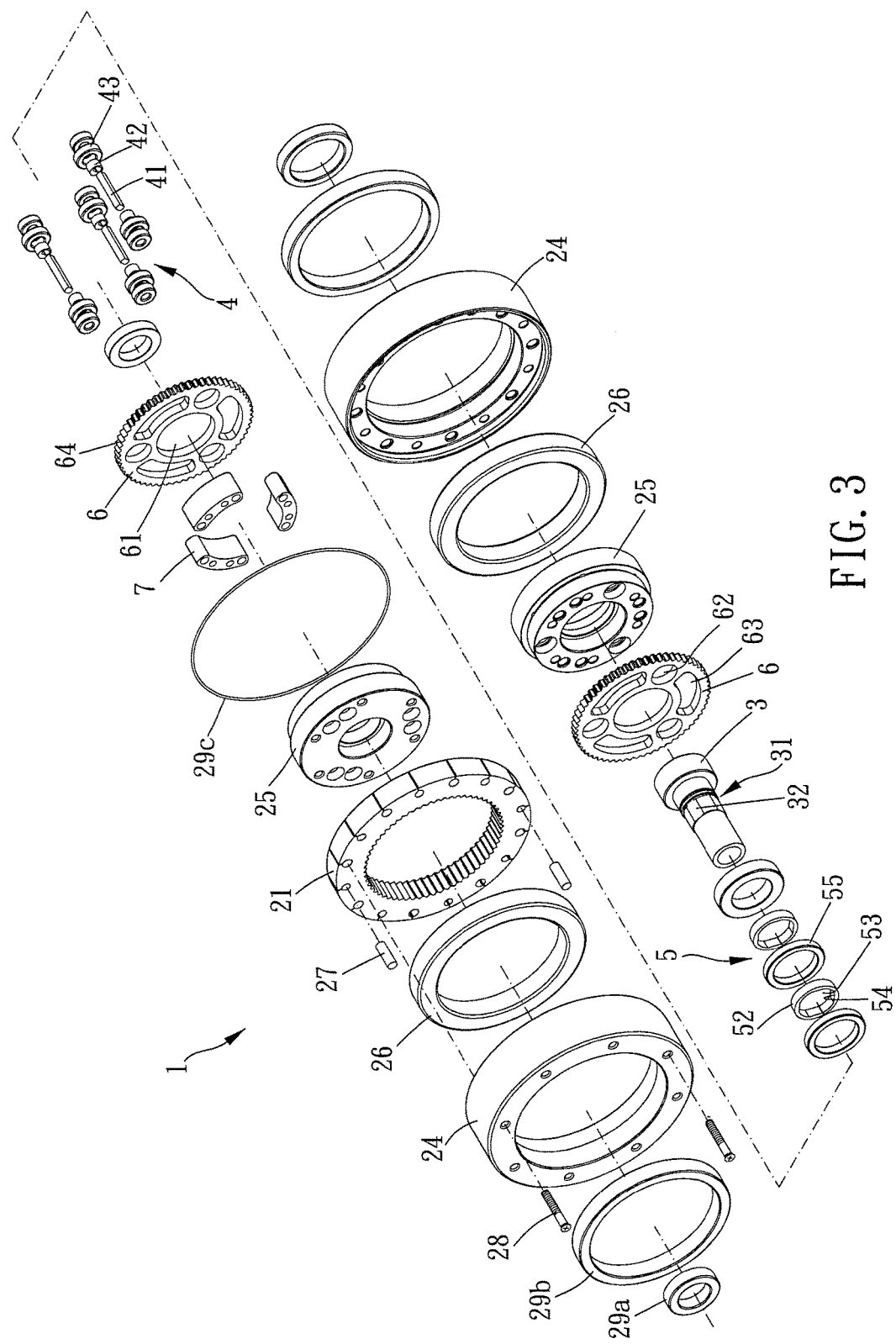
FIG. 3 is a breakdown view of the first embodiment of the present invention.
Figure 5:
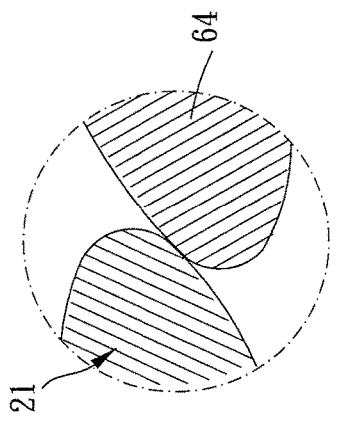
FIGS. 5 and 6 are enlarged views of a multi-arc teeth of the first embodiment of the present invention.
Figure 6:
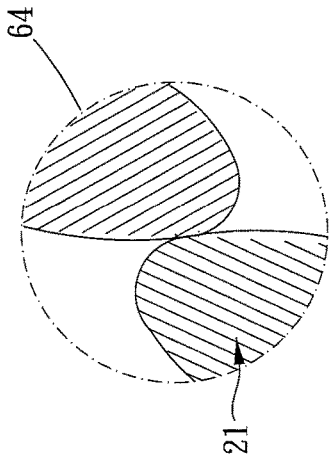
Figure 4:
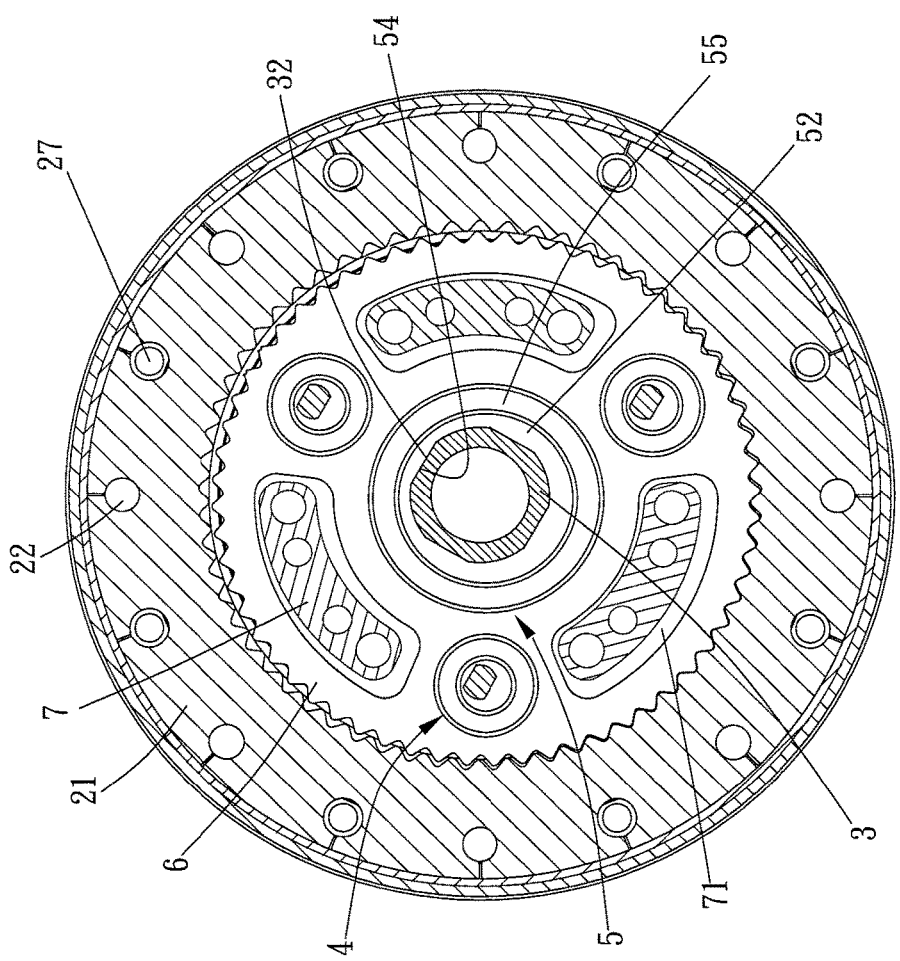
FIG. 4 is a cross-sectional view of the first embodiment of the present invention.
Figure 7:
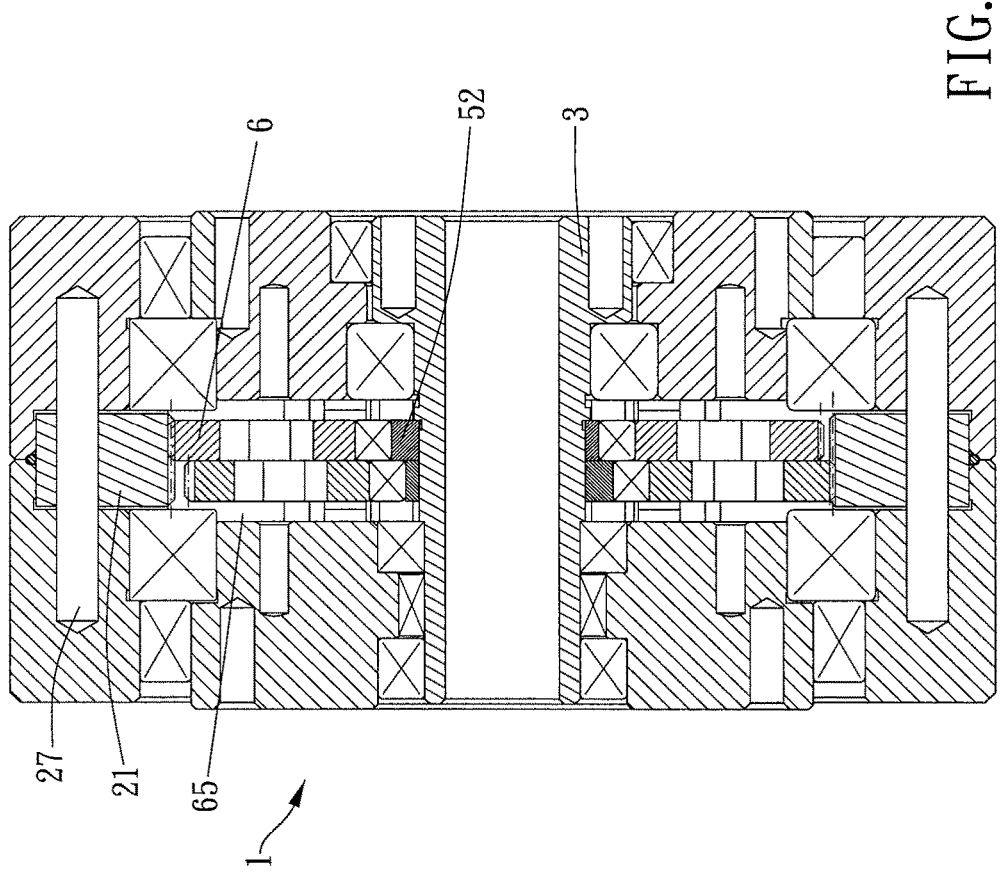
FIG. 7 is a cross-sectional view of the first embodiment of the present invention.

The present invention will be clearer from the following description when viewed together with the accompanying drawings, which show, for purpose of illustrations only, the preferred embodiment in accordance with the present invention.

Please refer to FIGS. 1 to 7 for a first embodiment of the present invention. A speed change device 1 includes an outer ring part 2, a spindle 3, a plurality of cam parts 5 and a plurality of inner gears 6.

The outer ring part 2 includes at least one outer gear 21 thereinside. The spindle 3 is coaxially pivoted to the outer ring part 2 with the at least one outer gear 21, the spindle 3 has a central axis 30, and an outer circumference of the spindle 3 has a plurality of cam assembling portions 31. The plurality of cam parts 5 are respectively and disassemblably sleeved on the plurality of cam assembling portions 31 and synchronizingly rotate with the spindle 3, at least two of the plurality of the cam parts 5 have a phase difference of angle which is larger than zero degree. The plurality of inner gears 6 are rigid and respectively sleeved on the plurality of cam parts 5, the plurality of inner gears 6 are non-rotatable with the plurality of the cam parts 5, and the plurality of inner gears 6 are respectively meshed with the at least one outer gear 21. Therefore, each said cam part 5 of the speed change device 1 is disassemblably fixed on the spindle 3, and each said cam part 5 can be replaced alone and arranged in different angles according to various requirements. In addition, the plurality of inner gears 6 rotate synchronizingly to drive the at least one outer gear 21 so as to decrease a bearing force of the each said inner gear 6 and elevate the conversion efficiency, the precision or the stability of the speed change device 1.

In this embodiment, the speed change device 1 further includes a plurality of secondary cam parts 4 and a plurality of struts 7 fixedly connected to the outer ring part 2. The strut 7 can enhance the stability and the structural strength of the speed change device 1. Each said secondary cam part 4 includes an axle 41 pivoted to the outer ring part 2, an secondary cam member 42 comovably sleeved on the axle 41 and an secondary bearing 43 sleeved on the secondary cam member 42, wherein each said inner gear 6 has a central hole 61 disposed around one of the cam parts 5 and a plurality of perforating holes 62 arranged around the central hole 61, the plurality of secondary cam parts 4 are respectively disposed through the plurality of perforating holes 62, each said perforating hole 62 is sleeved on one of the secondary bearings 43, and working curved faces of the secondary cam parts 4 and one of the cam parts 5 corresponding to one of the inner gears 6 face toward in directions which are in parallel so that each said secondary cam part 4 can stabilize the movement of the outer gear 21 and elevate the transmission of force. Each said inner gear 6 further has a plurality of curved guiding grooves 63 arranged around the central hole 61, each said curved guiding groove 63 is disposed around the struts 7, and an annular gap 71 exists between the curved guiding groove 63 and the strut 7 so that the inner gear 6 can move smoothly.

In this embodiment, each cam assembling portion 31 includes four (or at least one) axially-extending planes 32, two of the four axially-extending planes 32 are radially opposite to the other two of the four axially-extending planes 32, and preferably, each said cam part 5 has a sleeve hole 53 disposed therethrough and corresponding to the cam assembling portion 31 in shape. Each said cam part 5 includes a cam member 52 sleeved on one of the cam assembling portions 31 and an inner bearing 55 sleeved on the cam member 52, and each said inner gear 6 is sleeved on one of the inner bearings 55. Each said cam member 52 and respective one of the inner bearings 55 corresponding thereto are round and tightly sleeved on each other so that a force can be transmitted directly and completely and the structural strength is enhanced; therefore, the cam member 52 and the inner bearing 55 will not be damaged easily. A tooth portion of at least one of the outer gear 21 and the inner gear 6 is a multi-arc teeth portion 64, and preferably, both the outer gear 21 and the inner gear 6 are multi-arc teeth portion 64. The multi-arc teeth portion 64 is formed by a plurality of curves which are continuously connected to each other and have different curvature radiuses, and each tooth portion of the outer gear 21 and each tooth portion of the inner gear 6 are slidably meshed with each other and contact with each other tangentially so as to decrease friction. Each said cam member 52 has a sleeve hole 53 disposed therethrough, an inner wall of each said sleeve hole 53 is tightly sleeved on the cam assembling portion 31 corresponding to each said sleeve hole 53, the inner wall of each said sleeve hole 53 has four axially-extending abutting planes 54, the four axially-extending abutting planes 54 abut against the four axially-extending planes 32 to make the spindle 3 drive the cam member 52 to rotate, and the plurality of cam members 52 are sleeved on the spindle 3 equiangularly (but not limited thereto) so that the inner gears 6 can apply a force evenly on different angular positions of the outer gear 21.

In this embodiment, the outer ring part 2 further includes two shell bodies 24, two bases 25 and two base bearings 26, each said outer gear 21 has a plurality of through holes 22 annularly arranged thereon, a plurality of pins 27 are disposed through the through holes 22 and inserted into the two shell bodies 24, a plurality of fastening members 28 are disposed through the two shell bodies 24 and a part of the through holes 22, the two outer gears 21 are sandwiched between the two shell bodies 24, the two base bearings 26 are respectively sleeved on the two bases 25 and located on two sides of the plurality of inner gears 6, the two base bearings 26 respectively abut against and between the two shell bodies 24 and the two outer gears 21, the spindle 3 is disposed through the two outer gears 21, the two bases 25 and the two base bearings 26, and the plurality of struts 7 are disassemblably fixed to the two bases 25 so that the two bases 25 can stably position an inner structure of the speed change device 1.

In this embodiment, a sealing ring 29a, 29b 29c is further respectively disposed between the spindle 3 and each said base 25, between each said base 25 and each said shell body 24 and between the two shell bodies 24. An outer circumferentially face of each said outer gear 21 further has a plurality of narrow pass troughs 23 disposed radially, and each said through hole 22 communicates with one of the narrow pass troughs 23. A gap 65 exists between the plurality of inner gears 6 and each said base 25 to decrease friction. Preferably, a lubricating substance is disposed between the outer ring part 2 and the plurality of cam parts 5, and the lubricating substance flows in the speed change device 1 to decrease friction among members. The sealing rings can separate the interior and an exterior of the speed change device 1 to prevent the lubricating substance from leaking or prevent foreign matters from entering.

In practice, the spindle 3 rotates and drives the cam part 5 to rotate so that the inner gear 6 rotates to actuate the outer gear 21; therefore, the speed change device 1 does need extra gears to have a greater reduction ratio, and a volume of the speed change device 1 can be controlled within a small range. If the outer gear 21 rotates to drive the inner gear 6 to rotate and a force is exported from the spindle 3, there may be a greater speed-up ratio.

Figure 8:
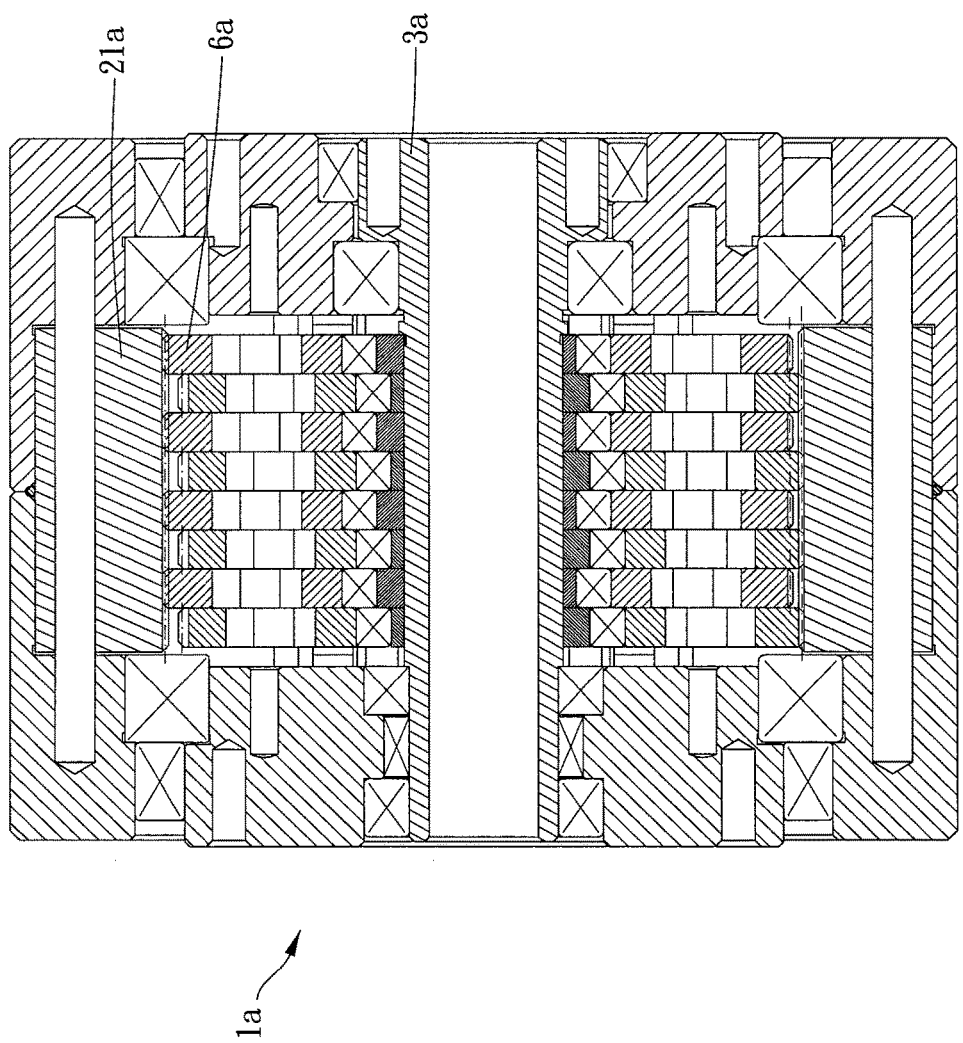
FIG. 8 is a cross-sectional view of a second embodiment of the present invention.

Please refer to FIG. 8 for a second embodiment. Through changing a spindle 3a in different lengths, a number of an inner gear 6a and an axial thickness of an outer gear 21a (in other embodiments, a number of the outer gear may be adjusted according to various requirements), the speed change device 1 can make the bearing forces on the inner gears 6a and the outer gears 21a more evenly.

Figure 10:
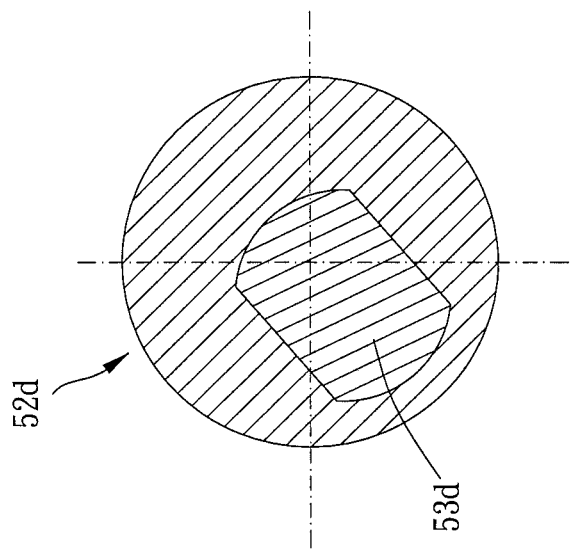
FIGS. 9 and 10 are drawings showing a cam member of a third embodiment of the present invention.
Figure 9:
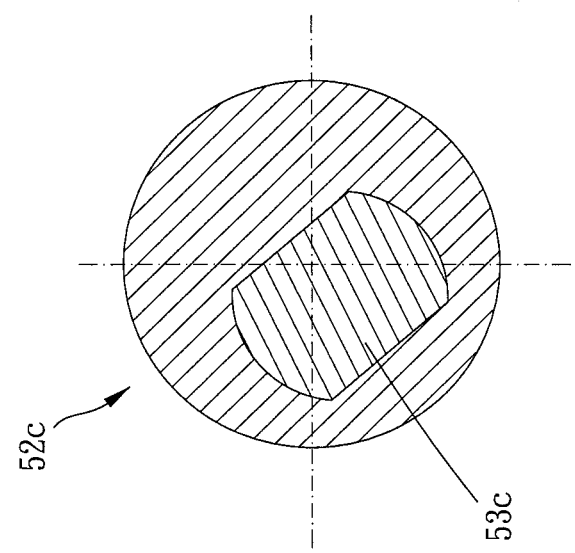

Please refer to FIGS. 9 and 10 for a third embodiment, a sleeve hole 53c of a cam member 52c and a sleeve hole 53d of a cam member 52d may be arranged along different radial longitudinal directions and positions as long as the inner and outer gears move stably.

In other embodiments, the cam assembling portion of each said spindle includes a plurality of axially-extending planes, each said cam part has a sleeve hole disposed therethrough, an inner wall of each said sleeve hole has an axially-extending abutting plane, and the axially-extending abutting planes (the cam members as shown in FIGS. 9 and 10) abut against different axially-extending planes; or the spindle of the speed change device has an axially-extending plane, each said cam part has a sleeve hole disposed therethrough, an inner wall of each said sleeve hole has an axially-extending abutting plane abutting against an axially-extending plane, at least two of the axially-extending abutting planes have a phase difference of angle which is larger than zero degree as long as the cam part of the speed change device is disassemblably fixed on the spindle.

In other embodiments, the axle of each said secondary cam part may extend beyond the base and be meshed with other active gears through being sleeved on at least one passive gear, and the spindle and the cam part may not tightly contact each other.

Given the above, the plurality of inner gears move synchronizingly and are with the plurality of secondary cam parts, so the precision, the stability and the service life of the speed change device increase. The speed change device has preferable energy utilization rate and is easy and quick to be disassembled and adjusted.

While we have shown and described various embodiments in accordance with the present invention, it should be clear to those skilled in the art that further embodiments may be made without departing from the scope of the present invention.

What is claimed is:
1. A speed change device, including:
an outer ring part, including at least one outer gear thereinside;

a spindle, coaxially pivoted to the outer ring part with the at least one outer gear, having a central axis, an outer circumference of the spindle having a plurality of cam assembling portions;
a plurality of cam parts, respectively disassemblably assembled to the plurality of cam assembling portions, synchronizingly rotating with the spindle, at least two of the plurality of cam parts having a phase difference of angle which is larger than zero degrees;
a plurality of inner gears, being rigid, respectively tightly circularly sleeved on the plurality of cam parts and being non-rotatable with the plurality of the cam parts, respectively meshed with the at least one outer gear;
a plurality of secondary cam parts;
wherein each said cam part includes a cam member sleeved on one of the cam assembling portions and an inner bearing sleeved on the cam member, and each said inner gear is sleeved on one of the inner bearings;
wherein each said cam member and respective one of the inner bearings corresponding thereto are round and tightly circularly sleeved on each other;
wherein each said secondary cam part includes an axle pivoted to the outer ring part, a secondary cam member comovably sleeved on the axle and a secondary bearing tightly circularly sleeved on the secondary cam member, wherein each said inner gear has a central hole disposed around one of the cam parts and a plurality of perforating holes arranged around the central hole, the plurality of secondary cam parts are respectively disposed through the plurality of perforating holes, each said perforating hole is tightly circularly sleeved on one of the secondary bearings, and working curved faces of the secondary cam parts and one of the cam parts corresponding to one of the inner gears face toward a same side and in directions which are in parallel;
wherein each said outer gear has a plurality of through holes annularly arranged thereon, an outer circumferentially face of each said outer gear further has a plurality of narrow pass troughs disposed radially, each said through hole communicates with one of the narrow pass troughs, a gap exists between the plurality of inner gears and the outer ring part, and a lubricating substance is disposed between the outer ring part and the plurality of cam parts.

2. The speed change device of claim 1, wherein each said cam assembling portion includes at least one axially-extending plane, and each said cam part has a sleeve hole which is a through hole and corresponds to the cam assembling portion in shape.

3. The speed change device of claim 1, wherein the spindle has an axially-extending plane, each said cam part has a sleeve hole which is a through hole, an inner wall of each said sleeve hole has an axially-extending abutting plane abutting against the axially-extending plane, and at least two of the axially-extending abutting planes have a phase difference of angle which is larger than zero degrees.

4. The speed change device of claim 1, wherein a tooth portion of at least one of the outer gears and the inner gear is a multi-arc teeth portion, the multi-arc teeth portion is formed by a plurality of curves which are continuously connected to each other and have different curvature radiuses, and each tooth portion of the outer gear and each tooth portion of the inner gear are slidably meshed with each other and contact with each other tangentially.

5. A speed change device, including:
an outer ring part, including at least one outer gear thereinside;
a spindle, coaxially pivoted to the outer ring part with the at least one outer gear, having a central axis, an outer circumference of the spindle having a plurality of cam assembling portions;
a plurality of cam parts, respectively disassemblably assembled to the plurality of earn assembling portions, synchronizingly rotating with the spindle, at least two of the plurality of cam parts having a phase difference of angle which is larger than zero degrees;
a plurality of inner gears, being rigid, respectively tightly circularly sleeved on the plurality of cam parts and being non-rotatable with the plurality of the cam parts, respectively meshed with the at least one outer gear;
a plurality of secondary cam parts;
wherein each said cam part includes a cam member sleeved on one of the cam assembling portions and an inner bearing sleeved on the cam member, and each said inner gear is sleeved on one of the inner bearings;
wherein each said cam member and respective one of the inner bearings corresponding thereto are round and tightly circularly sleeved on each other;
wherein each said secondary cam part includes an axle pivoted to the outer ring part a secondary cam member comovably sleeved on the axle and a secondary hearing tightly circularly sleeved on the secondary cam member, wherein each said inner gear has a central hole disposed around one of the cam parts and a plurality of perforating holes arranged around the central hole, the plurality of secondary earn parts are respectively disposed through the plurality of perforating holes, each said perforating hole is tightly circularly sleeved on one of the secondary bearings, and working curved faces of the secondary cam parts and one of the cam parts corresponding to one of the inner gears face toward a same side and in directions which are in parallel;
wherein each cam assembling portion includes four axially-extending planes, two of the four axially-extending planes are radially opposite to the other two of the four axially-extending planes, each said cam part has a sleeve hole which is a through hole and corresponds to the cam assembling portion in shape; a tooth portion of at least one of the outer gears and the inner gear is a multi-arc teeth portion, the multi-arc teeth portion is formed by a plurality of curves which are continuously connected to each other and have different curvature radiuses, and each tooth portion of the outer gear and each tooth portion of the inner gear are slidably meshed with each other and contact with each other tangentially; an inner wall of each said sleeve hole tightly contacts and is sleeved on the corresponding cam assembling portion; the inner wall of each said sleeve hole has four axially-extending abutting planes, the four axially-extending abutting planes abut against the four axially-extending planes; the plurality of cam members are sleeved on the spindle equiangularly; the outer ring part further includes two shell bodies, two bases and two base bearings, each said outer gear has a plurality of through holes annularly arranged thereon, a plurality of pins are disposed through the through holes and inserted into the two shell bodies, a plurality of fastening members are disposed through the two shell bodies and a part of the through holes, the at least one outer gear is sandwiched between the two shell bodies, the two base bearings are respectively sleeved on the two bases and located on two sides of the plurality of inner gears, the two base bearings respectively abut against and between the two shell bodies and the at least one outer gear, the spindle is disposed through the at least one outer gear, the two bases and the two base bearings; a sealing ring is further respectively disposed between the spindle and each said base, between each said base and each said shell body and between the two shell bodies; an outer circumferentially face of each said outer gear further has a plurality of narrow pass troughs disposed radially, each said through hole communicates with one of the narrow pass troughs; a gap exists between the plurality of inner gears and each said base; and a lubricating substance is disposed between the outer ring part and the plurality of cam parts.

6. The speed change device of claim 5, further including a plurality of struts fixedly connected to the outer ring part, wherein each said inner gear further has a plurality of curved guiding grooves arranged around the central hole, each said curved guiding groove is disposed around one of the struts, the plurality of struts are disassemblably fixed to the two bases, and an annular gap exists between the curved guiding groove and the strut.

\* \* \* \* \*